Jan. 5, 1937.   S. MECKLER   2,066,412
ANTISKID AND TRACTION DEVICE
Filed Dec. 4, 1935
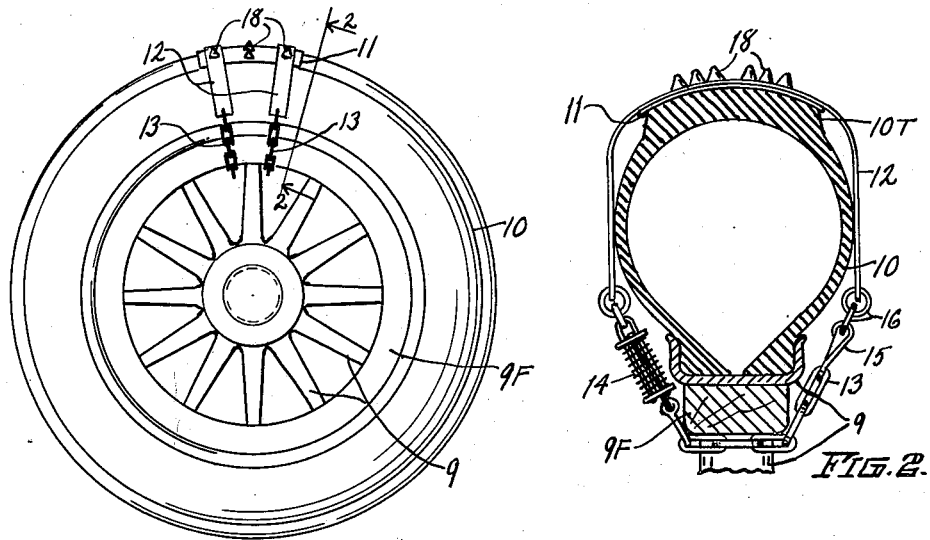
Fig. 1.
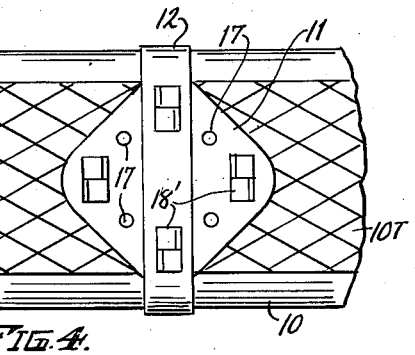
Fig. 2.
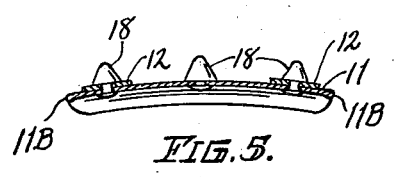
Fig. 3.
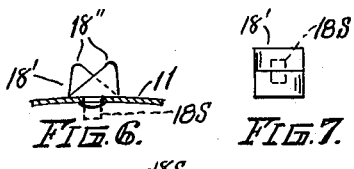
Fig. 4.
Fig. 5.   Fig. 6.   Fig. 7.
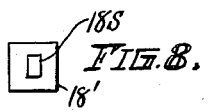
Fig. 8.
INVENTOR:
Samuel Meckler
BY David E. Carlsen
ATTORNEY.

Patented Jan. 5, 1937

2,066,412

UNITED STATES PATENT OFFICE 2,066,412

ANTISKID AND TRACTION DEVICE

Samuel Meckler, St. Paul, Minn.

Application December 4, 1935, Serial No. 52,815

2 Claims. (Cl. 152—14)

My invention relates to a device adapted to be placed on motor vehicle wheels and may be termed either an emergency traction device or a non-skid device its main use being during unfavorable road conditions such as when there is ice, deep snow or mud on or through which a motor vehicle must pass.

The main object is to provide a simple, highly efficient and inexpensive non-skid traction attachment for use on motor vehicle tires.

In the accompanying drawing:—

Fig. 1 is a side elevation of a motor vehicle wheel and one of my traction devices in operative position thereon. Fig. 2 is an enlarged cross sectional detail view as on line 2—2 in Fig. 1. Fig. 3 is an enlarged top view of the upper central part of Fig. 1 or in other words a face view of the traction device on a tire. Fig. 4 is a modification of Fig. 3. Fig. 5 is a longitudinal sectional view of the traction plate of my device as on line 5—5 in Fig. 3. Figs. 6, 7 and 8 are respectively a side, top and bottom view of a modified form of traction lug or tooth which may be used on either of the preferred forms of traction plates shown.

Referring to the drawing by reference numerals, like characters designating similar parts throughout the several views, 9 designates an auto wheel and 10 is the tire shown as a pneumatic tire but may be any kind of tire. 11 designates what I prefer to call a tread plate comprising a rectangular piece of sheet metal bearing longitudinally on the tread 10T of the tire and is of dished or shallow concaved formation to lie snugly on the tread or in other words it is shaped to conform to the face of the tire tread. This plate is preferably of spring sheet metal.

The tread plate may be of any desired length, preferably not over six inches, and is held in close contact with the tire tread as follows:

For the rectangular form of tread plate 11 shown in Figs. 1, 2, 3 and 5, I provide a pair of flat bar U-members 12, each fixed to the plate transversely near an end of the plate and both positioned to simultaneously straddle a tire, as in Fig. 2, their arms extending radially toward the center of the wheel and terminating just inwardly of the widest part of the tire. Said arms may also be simply integral parts of the plate. The two ends of each pair of arms are connected by a chain 13 in which is a compression spring 14 near one end and at the other end is a snap hook 15 to removably engage a ring 16 or the like. The spring members 14 may be of other design than that shown but in any case the length of chain spring and snap hook is such that the spring keeps considerable tension in the chain when the latter is passed under the wheel felly 9F and the snap hook is in connection at 16. Thus the chain, in tension pulling on the arms 12 and always in tension keep the tread plate close against the outer face of the tire tread.

The exterior face of the tread plate is provided with any suitable number of selectively spaced calks 18—18' each with a shank securable in an aperture 17 preferably by riveting at the under side of the plate. The apertures may be round or polygonal to retain correspondingly shaped shanks 18S of the calk or cleat members, said calks in Figs. 1, 2, 3 and 5 shown as being of conical form and designated 18. In Figs. 4, 6, 7 and 8 the cleats are shown in modified form and designated 18' each cleat having two integrally formed and outwardly directed tapered and flat teeth 18''. Other forms of traction calk may be used but in any case are tapered upwardly to prevent accumulation of mud, snow or ice on or between the calks.

In any form of the tread plate it is preferred that its perimetral edge be rounded, or beaded as at 11B in Fig. 5.

In the modification Fig. 4, the tread plate 11 is shown about square and retained on the tread of the tire with its outer edges diagonal thus presenting two rounded corners longitudinally on the tread and two rounded corners at the opposite edges of the tire tread. A single wide U-band is used to retain this simpler and smaller form of tread plate on the tire, the free ends of the single U-band arms being connected as above described. In place of the said single U-band the tread plate itself may be formed with a pair of integral extension arms.

It will be readily understood that in either form of this device, and when the wheel rotates to a position where the traction plate contacts the ground, the tire is flattened momentarily because of weight on it. With my type of traction plate of flexible sheet metal the plate under said condition of the tire flattens out also or springs to conform to the momentary distortion, then springs back to its normal, original position as the tire goes on to normal condition. Obviously the momentary flattening of the tire and plate moves the arms or arm 12 radially and there is slack in the chain or chains 13. However this slack is absorbed in the yieldable spring 14 retaining the chain in taut condition and there can be no rattling or chain noises when this device is in use.

The cleats of my device are preferably riveted on to the tread plate, the riveting being as flat as possible or the apertures 17 may be countersunk. The proportions of the cleats is optional but preferably not large and in the case of conical calks as in Figs. 1, 2, 3 and 5 they are preferably rounded considerably at the tips, as best shown in Fig. 5.

Obviously the springy action of the tread plate both as to transverse and lateral action and the outwardly tapered form of all types of the cleats provides a condition where there is no possibility of accumulation of snow, ice, etc., on the tread plate. The double arm type of my traction device is put on a tire as shown in Fig. 1 with the plate about centrally of and radially outward of a spoke of the wheel so that one chain can be passed across the wheel felly 9F at each side of the spoke.

The adaptability of my device is clear. If, for example, a car gets mired up to its hubs it is possible to attach one or more of these devices on the upper part of the drive wheels and then have sufficient traction to pull out of the mire.

Any suitable number of these devices may be put on auto wheels according to weather and road conditions. For muddy or snow covered roads it may be best to have the traction devices closely spaced so that at least one device is in action at all times.

Modifications may be made in various details, proportions and arrangement of parts within the scope of the following claims, as for example, the arms 12 may be integral of the tread plate 11 in either the double arm or single arm types.

I claim:

1. An emergency traction device for motor vehicle wheels, said device comprising a quadrangular flexible plate of shallow arcuate formation longitudinally and transversely to fit snugly the exterior face of a tire tread, the sides of the plate diagonally with relation to the sides of the tire, arm members extending integrally from the plate at opposite sides and directed toward the wheel center to straddle a tire in pairs, traction cleats on said tread plate in predetermined spaced relation, and a removable tension device connecting the arm members and engaging the wheel rim parts adjacent the tire, said cleats comprising each a double edged tooth one edge of which is offset relation to the other, both edges being parallel.

2. In a non-skid traction device for motor vehicles a quadrangular shallow plate adapted to lie snugly on the outer face of a tire, said plate formed with integral transversely and oppositely directed arms to straddle the tire, flexible means attached to one arm to pass thence inwardly across the wheel felly, spring actuated means connecting the said flexible means under tension to the other extension arm of the plate, and a number of double edged calks suitably fixed on the outer face of the plate, each calk tapered outwardly to an outer elongated road contacting edge, said pair of edges parallel but in offset relation to each other, for the purpose set forth.

SAMUEL MECKLER.